F. HARLOW.
ADJUSTABLE PROPELLER.
APPLICATION FILED DEC. 1, 1910.
1,019,635.
Patented Mar. 5, 1912.
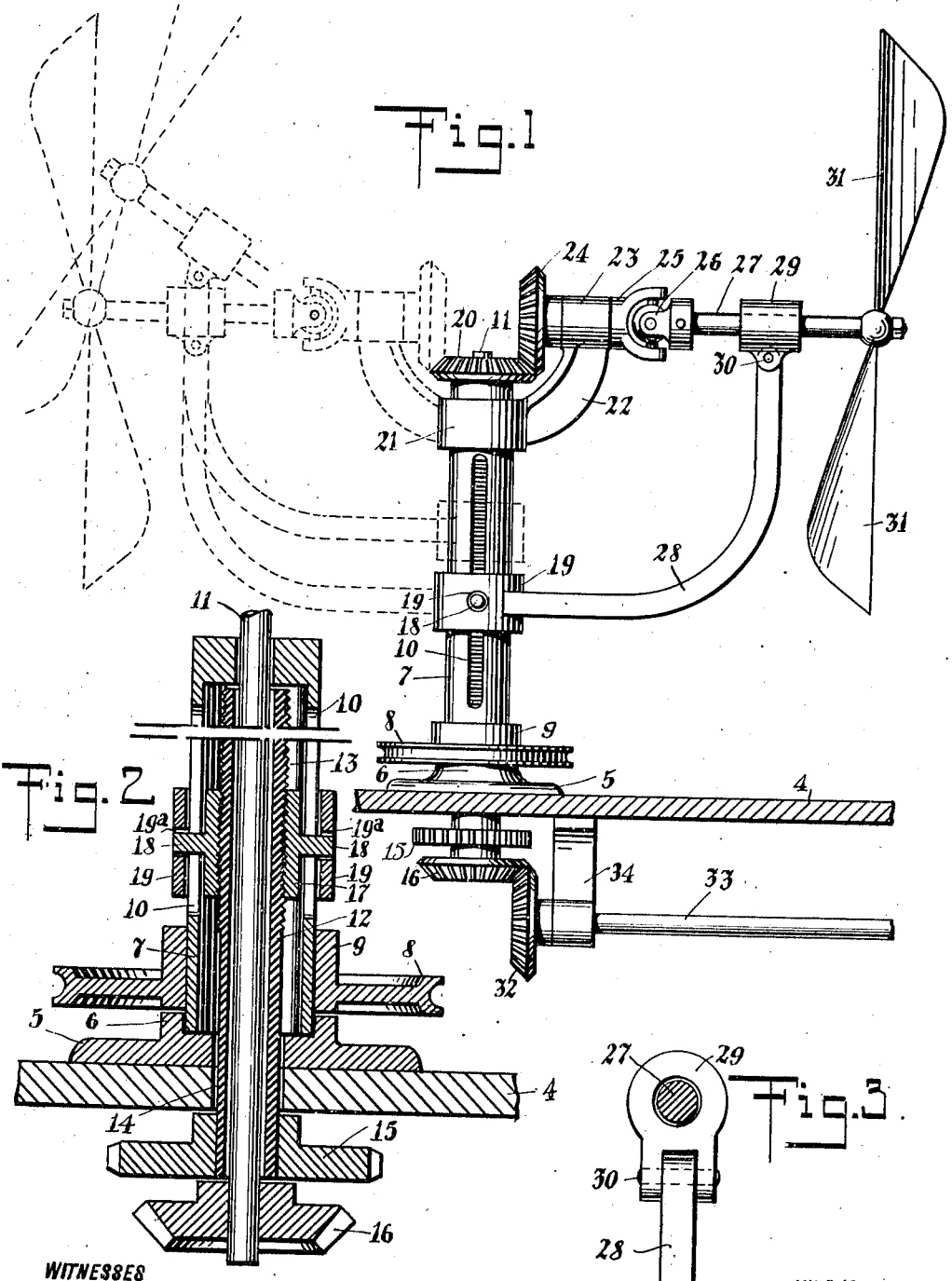
WITNESSES
INVENTOR
Frank Harlow
BY
ATTORNEYS

UNITED STATES PATENT OFFICE.

FRANK HARLOW, OF BOSTON, MASSACHUSETTS.

ADJUSTABLE PROPELLER.

1,019,635.

Specification of Letters Patent. Patented Mar. 5, 1912.

Application filed December 1, 1910. Serial No. 595,033.

*To all whom it may concern:*

Be it known that I, FRANK HARLOW, a citizen of the United States, and a resident of Boston, in the county of Suffolk and State of Massachusetts, have invented a new and Improved Adjustable Propeller, of which the following is a full, clear, and exact description.

My invention relates to adjustable propellers—that is, to propellers having an axis of rotation which may at will be extended to different angles.

My invention comprehends more particularly an adjustable propeller suitable for use upon airships, flying machines and various other types of mechanism in which it is desirable that the operator, by a very simple movement, may be able to shift the axis of the propeller quickly and effectively from one angle to another.

My invention comprehends means whereby the axis of the propeller may at will be directed into an infinite number of angular positions—the propeller being in fact capable of being turned in practically any direction.

Reference is to be had to the accompanying drawings forming a part of this specification, in which similar characters of reference indicate corresponding parts in all the figures.

Figure 1 is a side elevation showing my adjustable propeller complete; Fig. 2 is a detail showing in enlarged section the various operable parts used for handling the propeller and the shaft carrying the same; and Fig. 3 is a detail showing the bearing for supporting a portion of the propeller shaft.

Mounted upon a floor 4 is a pedestal 5 provided with a cup-like portion 6. A barrel 7 rests in this cup-like portion which serves as a bearing for the barrel. A pulley 8 is mounted rigidly upon the barrel 7 and for this purpose is provided with a hub 9 having a comparatively large bearing surface fitting tightly upon the barrel. The barrel 7 is provided with two slots 10 extending in the general direction of its length.

At 11 is a shaft which extends entirely through the barrel. Encircling this shaft and disposed partially within the barrel 7 is a sleeve 12 provided with a threaded portion 13. This sleeve extends through the pedestal 5 and also through an opening 14 in the floor 4.

At 15 is a wheel which is mounted rigidly upon the lower end of the sleeve 12 and is used for turning this sleeve.

At 16 is a miter gear which is secured rigidly upon the lower end of the vertical shaft 11. A ring 17 is threaded internally and fitted upon the threaded portion 13 of the sleeve 12, this ring being provided with trunnions 18 extending in opposite directions from it.

At 19 is an annular bearing which is provided with holes 19ª through which the trunnions 18 extend. Whenever the sleeve 12 is turned the ring 17 moves up or down carrying with it the annular bearing 19.

Mounted rigidly upon the upper end of the shaft 11 is a miter gear 20. A collar 21 encircles the upper portion of the barrel 7. Intregal with this collar and extending obliquely upward therefrom is an arm 22, the upper end of which is fashioned into a bearing 23.

At 24 is a miter gear which works upon a shaft 25, the latter being provided with a reduced portion extending through the bearing 23.

At 26 is a universal joint by aid whereof a shaft 27 is connected with the shaft 25.

Connected with the annular bearing 19 and extending outwardly therefrom is an arm 28. An annular bearing 29 is connected with the upper end of this arm by aid of a pivot pin 30, so that the annular bearing 29 may have a rocking movement relatively to the upper end of the arm.

At 31 are propeller blades which are secured upon the outer or free end of the shaft 27. Meshing with the miter gear 16 is another miter gear 32 which is mounted firmly upon a revoluble shaft 33, the latter being parallel with and below the floor 4, and supported by a hanger 34 depending from the floor.

The operation of my device is as follows: Power, being applied to the shaft 33, is transmitted through the gear pinions 32, 16, to the shaft 11 and thence through the gear pinions 20, 24, shaft 25, universal joint 26 and shaft 27 to the propeller blades 31, so that they revolve continuously. If, now, the gear wheel 15 be turned, it rotates the sleeve 12 and the threaded portion 13 of this sleeve causes the ring 17 to move up or down according to the direction of rotation of the sleeve. This causes the bearing 19 to move up or down and in so doing changes the vertical angle of the shaft 27. That is to say, the shaft moving upon the universal joint as a center is, at its outer end, raised or lowered so that the propeller is directed to different vertical angles according to the degree of rotation of the wheel 15. Again, if the pulley 8 be turned, it carries with it the barrel 7, and in so doing causes the bearing 19 and arms 28, 22 to turn upon a vertical axis. This causes the propeller shaft 27 to be shifted around in a horizontal plane, as will be understood by contrasting the full and dotted lines in Fig. 1. The operator, by merely causing the rotation of the wheel 15 or the pulley 8, or both of them, can shift the propeller to almost any desired angle, and this can be done without any cessation of the power as transmitted through the gearing to the propeller blades. The result is that the propeller may be shifted to different angles while turning. This renders the device of peculiar value in connection with airships and flying machines.

I do not limit myself to the particular construction herein shown, nor to any special means for shifting the shaft 27 to different angles relatively to other parts. Neither do I limit myself in all instances to the arrangement of the various fixed and movable parts as herein shown, the scope of my invention being commensurate with my claims.

Having thus described my invention, I claim as new and desire to secure by Letters Patent:

1. The combination of a barrel, a pulley mounted fixedly thereupon for turning said barrel, a shaft extending axially through said barrel and through said pulley, a gear member mounted upon said shaft for turning the latter continuously, an arm provided with a bearing, said bearing being slidably mounted upon said barrel, said arm being also provided with a second bearing pivotally connected with it, a shaft extending through said last-mentioned bearing and made in separate parts connected together by a universal joint, a gear member carried by said last-mentioned shaft, and meshing with said first-mentioned gear member, and two propellers mounted upon one of said separate parts connected together by said universal joint.

2. The combination of a barrel provided with a slot, means for turning said barrel, a revoluble sleeve mounted within said barrel and provided with a thread mechanism for turning said sleeve, a ring provided internally with a thread and operatively fitted upon said sleeve, said ring being provided with a trunnion extending through said slot in said barrel, an annular bushing encircling said trunnion, said bushing serving as a bearing which is slidable relative to said barrel, an arm connected with said bushing and adapted to be raised and lowered as said bushing is raised and lowered during the rotation of said sleeve, a shaft extending through said barrel and through said sleeve, a gear wheel mounted upon said ring, a second gear wheel engaging said first-mentioned gear wheel, and a shaft made in two parts connected together by a universal joint, one of said parts being connected with said second-mentioned gear wheel, the other of said parts engaging said second-mentioned bearing carried by said arm, and a propeller mounted upon said last-mentioned part.

In testimony whereof I have signed my name to this specification in the presence of two subscribing witnesses.

FRANK HARLOW.

Witnesses:
FRANK E. WRIGHT, Sr.,
FRANK E. WRIGHT, Jr.